United States Patent
Andersson

(10) Patent No.: US 10,220,543 B2
(45) Date of Patent: Mar. 5, 2019

(54) CORE DRILL WITH DETACHABLE END PORTION

(71) Applicant: Kjell Andersson, Kil (SE)

(72) Inventor: Kjell Andersson, Kil (SE)

( * ) Notice: Subject to any disclaimer, the term of this patent is extended or adjusted under 35 U.S.C. 154(b) by 0 days.

(21) Appl. No.: 15/527,428

(22) PCT Filed: Nov. 19, 2014

(86) PCT No.: PCT/SE2014/000136
§ 371 (c)(1),
(2) Date: May 17, 2017

(87) PCT Pub. No.: WO2016/080869
PCT Pub. Date: May 26, 2016

(65) Prior Publication Data
US 2017/0320236 A1  Nov. 9, 2017

(51) Int. Cl.
*B23B 51/04* (2006.01)
*B28D 1/04* (2006.01)

(52) U.S. Cl.
CPC .......... *B28D 1/041* (2013.01); *B23B 51/0473* (2013.01); *B23B 2250/12* (2013.01);
(Continued)

(58) Field of Classification Search
CPC ............ B23B 51/0473; B23B 2240/00; B23B 2251/02; Y10T 279/895; Y10T 279/95;
(Continued)

(56) References Cited

U.S. PATENT DOCUMENTS 1,855,873 A * 4/1932 Shortell .............. B23B 51/0473
408/206
2,167,014 A * 7/1939 Verderber ............... B23B 31/06
279/103
(Continued)

FOREIGN PATENT DOCUMENTS

CA  2843279 A1 *  2/2013 ........... E21B 17/046
DE  3004077 A1 *  8/1981 ........... B23B 51/042
(Continued)

OTHER PUBLICATIONS

International Search Report issued in parent international application No. PCT/SE2014/000136, dated Aug. 19, 2015, pp. 1-2.

*Primary Examiner* — Daniel Howell
*Assistant Examiner* — Chwen-Wei Su
(74) *Attorney, Agent, or Firm* — Jeffrey S. Melcher; Melcher Patent Law PLLC

(57) ABSTRACT

The invention relates to a core drill with an end portion (3) and a drill bit portion (1-2). The end portion and the drill bit portion are joinable in a watertight fashion with a sealing element (11). The sealing element (11) is provided in a space between the end portion and the drill bit portion, such that it is being compressed in a sealing fashion when the end portion and the drill bit portion are joined. The end portion and the drill bit portion are locked together with a joining element (8, 10) which achieves this locking effect when moves in the radial direction of the core drill. When the joining element moves in this direction, the end portion and the drill bit portion move towards each other. Thus the sealing element is being compressed while concurrently the end portion and the drill bit portion are joined together. This is further achieved without the joining element having to extend in the axial direction of the core drill. Typically, the joining element (8, 10) is constituted by a set screw.

6 Claims, 4 Drawing Sheets

(52) U.S. Cl.
CPC ... *B23B 2260/124* (2013.01); *B23B 2260/126* (2013.01); *Y10T 279/17821* (2015.01); *Y10T 408/895* (2015.01); *Y10T 408/95* (2015.01)

(58) Field of Classification Search
CPC ........... Y10T 279/94; Y10T 279/17821; Y10T 408/895; Y10T 408/95; Y10T 408/94
See application file for complete search history.

(56) References Cited

U.S. PATENT DOCUMENTS

| | | | | |
|---|---|---|---|---|
| 4,589,807 A | * | 5/1986 | Martin | ............... B23B 51/0406 408/204 |
| 9,821,379 B2 | * | 11/2017 | Hoop | .................. B23B 51/0466 |
| 2005/0226694 A1 | * | 10/2005 | Agehara | ............... B23B 31/008 408/204 |

FOREIGN PATENT DOCUMENTS

| | | | | |
|---|---|---|---|---|
| DE | 3533929 | | 11/1986 | |
| DE | 102011089546 A1 | * | 6/2013 | ......... B23B 51/0406 |
| EP | 0430536 | | 6/1991 | |
| FR | 2860829 | | 4/2005 | |
| GB | 386372 | | 1/1953 | |
| JP | 2007136817 A | * | 6/2007 | |
| SE | 537295 | | 1/2015 | |

* cited by examiner

CORE DRILL WITH DETACHABLE END PORTION

The present invention relates to a core drill with a detachable end portion according to the introductory portion of the independent claim.

In particular, it relates to such a core drill with a detachable end portion intended to be used as a concrete drill.

BACKGROUND OF THE INVENTION

Core drills with a detachable end portion are well known and on example is found in GB686372A. Core drills are normally used with a cooling liquid, and in order to make the liquid reach the parts of the drill where the need for cooling is the largest, it is important to achieve an effective sealing between the end portion and the drill bit. It is also simplifying if, once the end portion has been removed, full access is gained to the full inner diametre of the drill bit, as this facilitates removal of the drill core. The drill bit itself is often thin walled, so achieving both these advantages with one and the same design is hard to achieve.

An object of the invention is therefore to provide a core drill with a detachable end portion where access to the full inner diameter of the drill bit is gained once the end portion is removed.

These and other objects are attained by a core drill with a detachable end portion according to the characterising portion of the independent claim.

SUMMARY OF THE INVENTION

The invention relates to a core drill comprising at least an end portion 3 and a drill bit portion 1-2. The end portion and the drill bit portion are joinable in a watertight fashion with a sealing element 11. The sealing element 11 is provided in a space between the end portion and the drill bit portion, such that it is being compressed in a sealing fashion when the end portion and the drill bit portion are joined. The end portion and the drill bit portion are locked together with a joining element 8, 10 which achieves this locking effect when moves in the radial direction of the core drill. This advantageously achieves that, when the screw portion 8 moves in essentially the radial direction of the drill, the end portion and the drill bit portion are joined together while the sealing element concurrently is being compressed. This is further achieved without the joining element having to extend in the axial direction of the core drill, which is advantageous as the drill bit is thin walled and not suited for being provide with through holes extending in that direction.

In an advantageous embodiment, the drill bit portion 1-2 comprises a drill bit 1 and an attachment portion 2. The attachment portion is arranged to receive the end portion, and the attachment portion is arranged to constitute a first part 8 of a pair of interacting parts that jointly constitute the joining element 8, 10. Typically, the first part 8 of the joining element 8, 10 is constituted by a set screw. When the end portion has been removed, the full inner diameter of the drill bit 1-2 is advantageously accessed.

DESCRIPTION OF A PREFERRED EMBODIMENT

Figure 1:
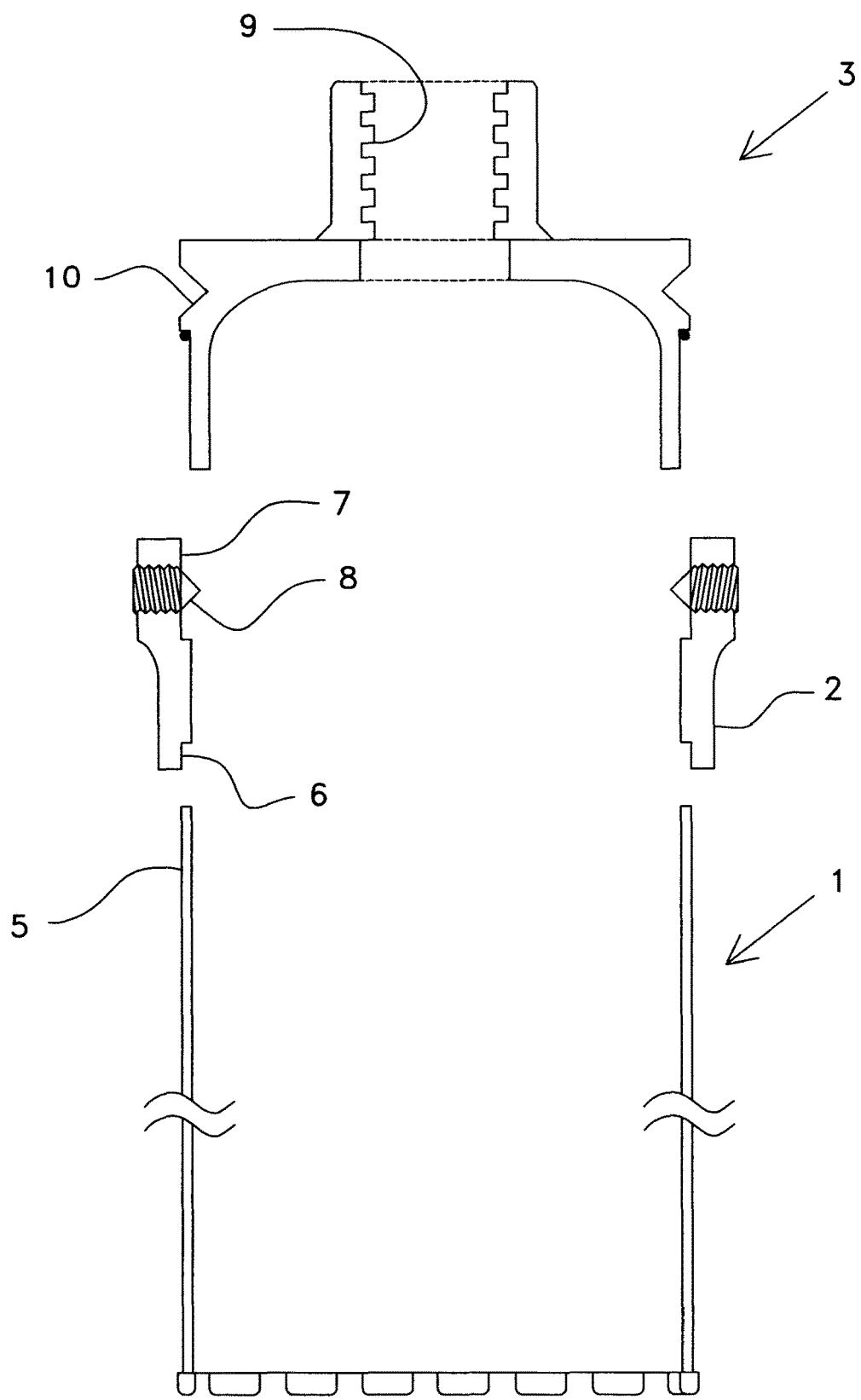
FIG. 1 shows a cross section through a core drill split in three parts

FIG. 1 shows a cross section through an embodiment of a core drill according to the invention split in three parts. The core drill is normally made from two detachable parts, and the illustration shows the core drill as it looks in the production phase, while facilitates understanding of its design. The core drill may for example be indented for drilling in concrete.

The core drill is split into a drill bit 1, an attachment portion 2 for the drill bit and an end portion 3. The drill bit 1 and the attachment portion 2 are normally constituted by one composite entity denoted drill bit portion 1, 2. The drill bit portion 1, 2 may be joined with the end portion 3 and fastened with screws, as is described in greater detail in conjunction to the figures below.

The drill bit 1 is constituted by a pipe 5 and, at the end of the pipe that faces away from the attachment portion 2, a series of teeth 6 are arranged. The teeth are arranged such that they extend both beyond the outer diameter of the pipe and inside the inner diameter. The drill core that remains inside the drill bit after use, has a diameter very close to the diameter of the opening formed by the teeth, such that if just a small chip ends up inside the drill bit, it gets very difficult to remove the core from the drill bit. Instead of the drill bit being provided with a permanently attached end portion, the drill bit is attached to the end portion using the attachment portion 2, and may then easily be detached such that the core can be removed.

The attachment portion 2 is constituted by a pipe section with a minimum inner diameter identical to the inner diameter of the drill bit, such that the drill core is not prevented from sliding out of the drill bit portion 1, 2 by an element that extend into the drill bit. The attachment portion has a groove 6 in its lower portion, with an inner diameter equivalent to the outer diameter of the drill bit, such that the attachment portion 3 may be slid onto the drill bit and attached using an adhesive of by welding.

The attachment portion has a groove 7 in its upper portion with an inner diameter equivalent to the outer diameter of the end portion 3, such that the end portion may be slid onto the attachment portion and attached to it using a set screw 8. The set screw has such a length that, when fully screwed in, it does not extend out from the outer diameter of the attachment portion at all.

The end portion is at its upper end provided with a regular thread for attaching it to a drill. the widest section of the end portion is arranged Below the treaded portion, and it has an outer diameter identical to the outer diameter of the drill bit. A conical recess 10 is provided at the widest portion, that is arranged to receive the set screw from the attachment portion 2. Below the widest portion is a portion with a smaller outer diametre, and this recessed portion is received by the middle portion of the attachment portion that has the smallest outer diameter.

Figure 2:
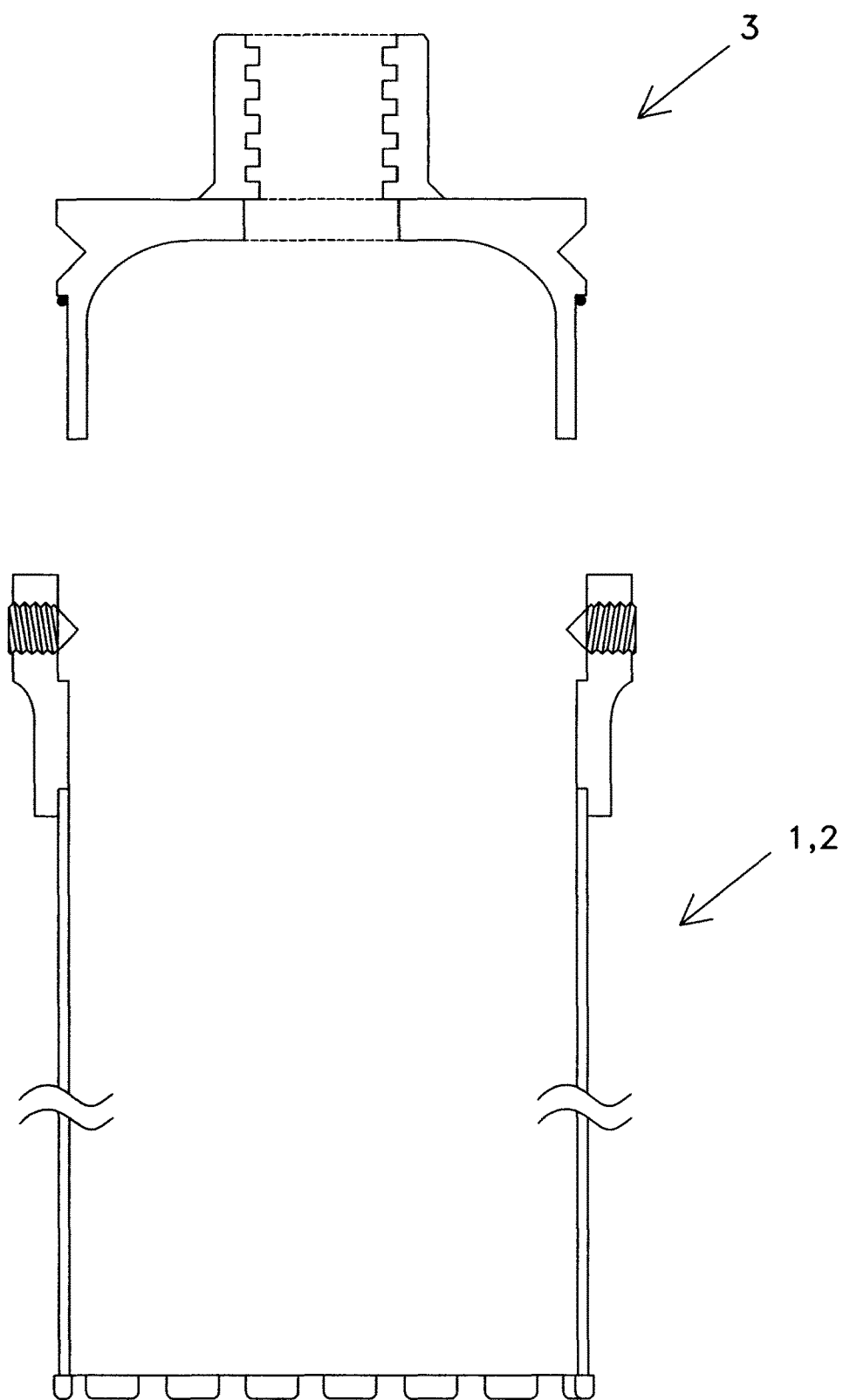
FIG. 2 shows a cross section through two separated parts of the core drill

FIG. 2 shows a cross section through the two parts of the core drill, separated the way they normally are at delivery, that is into a lower drill bit portion 1, 2 and an upper end portion 3.

Figure 3:
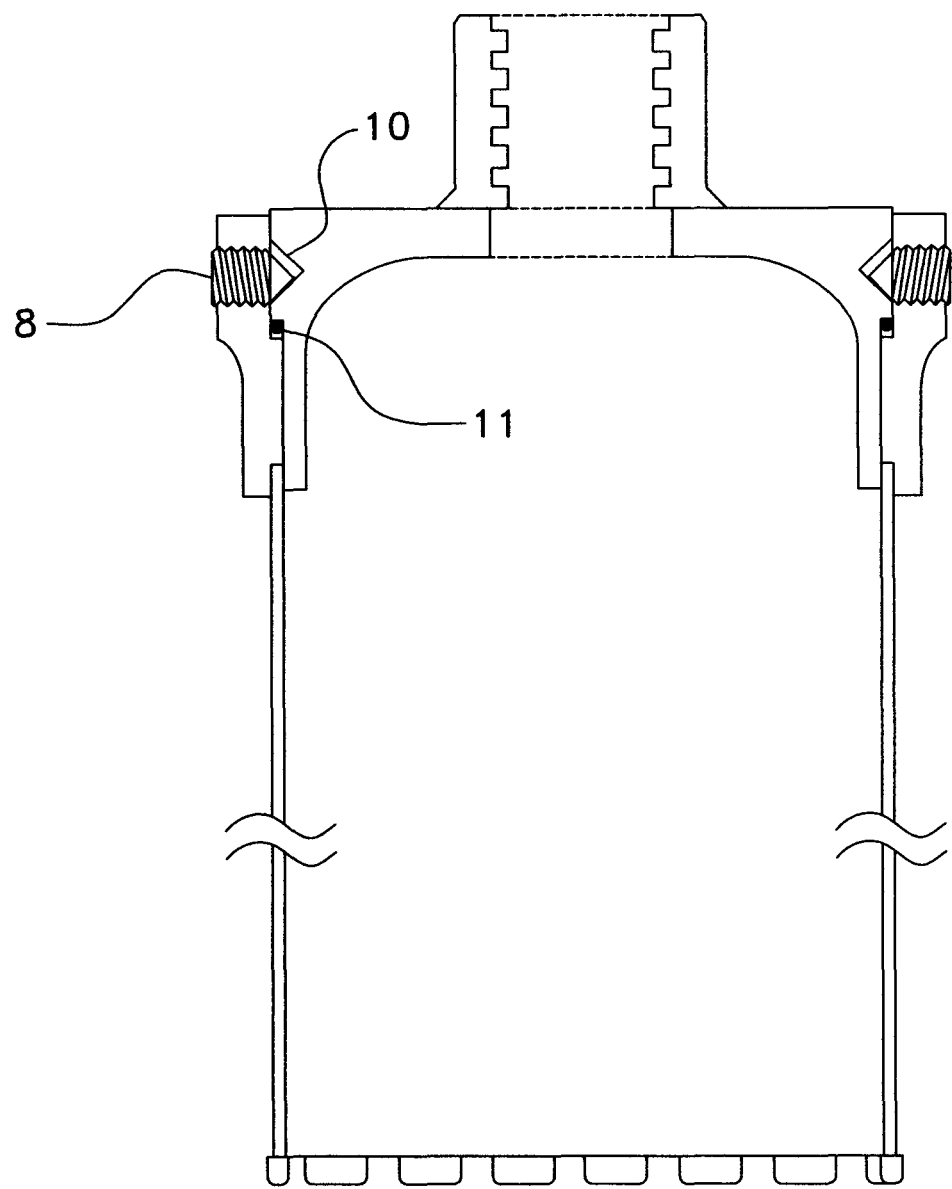
FIG. 3 shows a cross section through the core drill with the two parts joined

FIG. 3 shows a cross section through the core drill with its two parts fully joined together. The set screws extend a section into the conical receses 10 of the end portion, but have not yet been screwed in fully. This leaves room for the end portion to be shifted somewhat upwards from its final position.

An o-ring 11 is provided immediately below the widest section of the end portion. The middle section of the attachment portion, having the smallest inner diameter, does not extend all the way to the o-ring and the o-ring is not yet fully compressed and does not yet seal fully.

Figure 4:
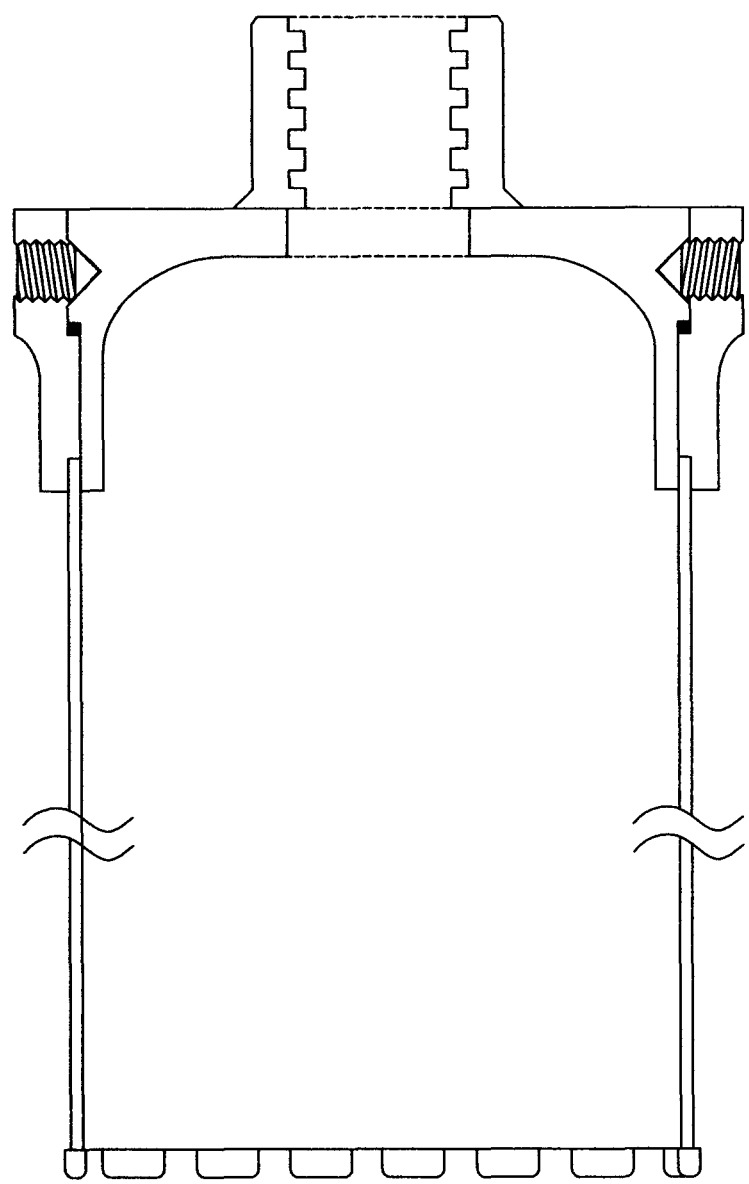
FIG. 4 shows a cross section through the core drill with the two parts joined and screwed together

FIG. 4 shows a cross section through the core drill with its two parts fully joined and fully screwed together, such that the set screw extends fully into the conical recesses 10 of the end portion. This forces together the drill bit portion 1, 2 and the end portion 3 into the final position for use. I this position, the middle section of the attachment portion having the smallest inner diameter, extends all the way up to the o-ring and extens so far that the o-ring is being compressed and now seals fully.

As the drill bit is thin walled, it is hard to join the end portion with the drill bit using screws that extend in the direction of the centre axis of the drill bit. It is most suitable to use screws or other attachment elements that are moved in the radial direction, as is in the disclosed embodiment. One would then normally loose the effect that evenly contracts the end portion towards the drill bit portion, but with a set screw and a matching conical recess this continuous contraction is again achieved, which suitably compresses an o-ring in the direction of the centre axis of the core drill. Obviously, it may be sufficient to only use a conical recess corresponding to the one described in the disclosed embodiment and an ordinary screw. Alternatively, a set screw or other attachment element with a conical end may cooperate with a hole that is not conical. Obviously, the sealing element does not have to be constituted by an o-ring, but may instead be constituted by various types of gaskets.

The invention claimed is:

1. A core drill having a liquid cooled, removable drill bit, the core drill comprising:
    an end portion having at a first end a drill thread configured for attaching to a drill and an outer surface of the end portion at a second end having at least one recess for receiving an end of a screw;
    a drill bit portion comprising a pipe having teeth at a first end of the pipe and a second end of the pipe opposite the first end, the pipe defining a hollow chamber to contain a core, wherein the drill bit portion is configured to be removable from the end portion to replace the drill bit portion and access a core contained in the pipe;
    an attachment portion configured for removably locking the second end of the drill bit portion to the end portion, the attachment portion being mounted on the second end of the drill bit portion, the attachment portion comprising at least one threaded hole having threaded screw that can be screwed between a locking position to lock the drill bit portion to the end portion and a non-locking position to allow removal of the drill bit portion from the end portion, an inner diameter of the attachment portion configured to fit around the outer diameter of the second end of the end portion, wherein as the screw is screwed towards the locking position the screw moves in a radial direction towards a central axis of the core drill so that the end of the screw enters the recess, and at least one of the end of the screw or the recess having an angled surface so that as the screw is screwed towards the locking position the drill bit portion is forced towards the end portion in a direction parallel to a center axis of the core drill by the end of the screw moving against a surface in the at least one recess; and
    a sealing element configured to removably seal the end portion to the second end of the drill bit portion to form a watertight seal between the end portion and the drill bit portion when the screw is in the locked position, wherein the sealing element is disposed between the end portion and the second end of the drill bit portion or attachment portion, and the sealing element is compressed when the screw is in the locked position by the drill bit portion being forced towards the end portion.

2. The core drill according to claim 1, wherein when the end portion and the drill bit portion are fully locked together, the screw does not extend beyond a maximum extent of the attachment portion.

3. The core drill according to claim 1, wherein the screw comprises a set screw.

4. The core drill according to claim 1, wherein the at least one recess comprises a conical recess.

5. The core drill according to claim 1, wherein the pipe is thin walled.

6. The core drill according to claim 1, wherein the attachment portion is welded to the pipe.

* * * * *